United States Patent
Golaup et al.

(10) Patent No.: US 8,620,336 B2
(45) Date of Patent: Dec. 31, 2013

(54) ACCESS TO A CELLULAR NETWORK FOR MACHINE TYPE COMMUNICATION DEVICES

(75) Inventors: Assen Mahaboob Khan Golaup, Newbury (GB); Christopher David Pudney, Newbury (GB); Timothy James Frost, Madrid (ES)

(73) Assignee: Vodafone IP Licensing Liminted, Newbury, Berkshire (GB)

( * ) Notice: Subject to any disclaimer, the term of this patent is extended or adjusted under 35 U.S.C. 154(b) by 141 days.

(21) Appl. No.: 13/065,767

(22) Filed: Mar. 29, 2011

(65) Prior Publication Data
US 2011/0244907 A1 Oct. 6, 2011

(30) Foreign Application Priority Data
Mar. 30, 2010 (GB) .................................... 1005312.2

(51) Int. Cl.
*H04W 72/00* (2009.01)

(52) U.S. Cl.
USPC ............ 455/450; 455/434; 455/515; 370/319

(58) Field of Classification Search
USPC ........................... 455/434, 450, 515; 370/319
See application file for complete search history.

(56) References Cited

U.S. PATENT DOCUMENTS

| | | | | |
|---|---|---|---|---|
| 7,899,010 B2* | 3/2011 | Choi et al. | ..................... | 370/329 |
| 2011/0199905 A1* | 8/2011 | Pinheiro et al. | ............... | 370/235 |

FOREIGN PATENT DOCUMENTS

| | | |
|---|---|---|
| EP | 2 309 800 A1 | 4/2011 |
| GB | 2476415 A | 6/2011 |
| WO | WO 00/52948 | 9/2000 |
| WO | WO 2007/051910 A1 | 5/2007 |
| WO | WO 2008/005206 A2 | 1/2008 |
| WO | WO 2008/094670 A2 | 8/2008 |
| WO | WO 2011/053219 A1 | 5/2011 |
| WO | WO 2011/071449 A1 | 6/2011 |
| WO | WO 2011/079792 A1 | 7/2011 |

OTHER PUBLICATIONS

3GPP TS 22.368 v10.0.0 (Mar. 2010), "Service requirements for Machine-Type Communications (MTC)" retrieved from http://www.3gpp.org/ftp/Specs/html-info/22368.htm.
3GPP TS 22.011 V9.3.0 (Dec. 2009), Technical Specification, 3$^{rd}$ Generation Partnership Project; Technical Specification Group Services and System Aspects; Service accessibility (Release 9), 24 pp.
3GPP TS36.304 V9.1.0 (Dec. 2009), Technical Specification, 3$^{rd}$ Generation Partnership Project; Technical Specification Group Radio Access Network; Evolved Universal Terrestrial Radio Access (E-UTRA); User Equipment (UE) procedures in idle mode (Release 9), 31 pp.

* cited by examiner

*Primary Examiner* — Amancio Gonzalez
(74) *Attorney, Agent, or Firm* — Muirhead and Saturnelli, LLC (57) ABSTRACT

Controlling access by a User Equipment (UE) to a cellular network may be effected by: receiving an instruction at the UE from a base station of the cellular network regarding transmission by the UE over a Random Access Channel (RACH) of the cellular network; and controlling when transmissions are made from the UE over the RACH, on the basis of the received instruction. In some cases, a transmission over the RACH may be made in response to the received instruction, which gives permission for the UE to transmit if it has data to send. In other cases, the instruction specifies a Group Identifier, which is compared with a Group Identifier specific to the UE and transmission over the RACH may be avoided based on the comparison. In particular, the UE may be a Machine Type Communication device.

20 Claims, 3 Drawing Sheets

ACCESS TO A CELLULAR NETWORK FOR MACHINE TYPE COMMUNICATION DEVICES

TECHNICAL FIELD

This application relates to controlling access of a User Equipment (UE) or a plurality of User Equipment to a cellular network, a UE for a cellular network and a base station for a cellular network.

BACKGROUND OF THE INVENTION

User Equipment (UE or UEs in plural) in a cellular network, such as Third Generation Partnership Project (3GPP) Universal Mobile Telecommunications System (UMTS) or Long Term Evolution (LTE), make use of a random access procedure to gain access to the network. According to this procedure, UEs randomly choose a signature (a temporary identifier) from a group of broadcast signatures and attempt to access the network in some predefined time slots when it has data to send, for signalling purposes or both.

In such scenarios, there is a risk that two UEs make use of the same signature at the same time and a collision results. The network operator can dimension the network with an adequate number of signatures and with sufficient access opportunities to keep the collision probability low (typically 1%).

Machine Type Communication (MTC) devices (sometimes referred to as Machine-to-Machine or M2M devices) are increasingly being used for a variety of applications. Their numbers are expected to grow at a high rate. MTC devices are typically automated data reporting systems such as utility meters or status reporting devices. Since the volume of data transmitted and received by such devices is low, cellular networks may not expect the large numbers of MTC devices to require significant changes to network dimensions.

Such devices may be programmed to send data at a specific time, often at a time when network activity is normally low (for example, late at night). It is therefore likely that a large number of MTC devices may be configured to send data at or around the same time. If a large number of MTC devices try to send respective access messages over the Random Access Channel (RACH) of the network at the same time, the resources reserved by the network for random access would be overwhelmed.

There are existing approaches to deal with random access messages from different UEs colliding (that is being transmitted simultaneously). In one approach, each UE is expected to wait (known as backing-off) for a time interval of random length, before attempting a further random access message. However, the more collisions that occur, the longer will be the time taken by UE to access the network. This will result in a longer call setup delay, which is detrimental to the user experience.

If a large number of MTC devices try to access the network simultaneously, the number of collisions will significantly increase. In view of the large number of devices, simply backing-off for a random interval before trying again will not solve the problem. Moreover, the user experience for other UEs will become extremely degraded.

Another approach for dealing with large RACH intensity is known as Access Class Barring. This was designed to cope with very rare situations, where a large number of UEs all try to access the network at the same time. For instance, it is well known that on special occasions (such as New Year's Eve), during a sporting event or in an emergency situation, the network may experience a surge in network access attempts over the RACH by UEs.

Access Class Barring is available in UMTS and LTE networks to deal with this situation. As explained in 3GPP TS 22.011, which is incorporated herein by reference, all UEs are members of one out of ten randomly allocated mobile populations, defined as Access Classes 0 to 9. The Access Class is stored in the Subscriber Identity Module (SIM) or Universal Subscriber Identity Module (USIM) of the UE. In addition, UEs may be members of one or more out of 5 special categories (Access Classes 11 to 15), also held in the SIM or USIM, which are allocated to specific high priority users. In LTE for example, the network can prevent a certain fraction of UEs from accessing the network for a certain time. This is achieved by broadcasting information about the barring factor to use, the time UEs should be barred from accessing the network and to which type of traffic the barring applies, for instance Mobile Originating (MO)-signalling, MO-Data. Since, the allocation of Access Classes is random, by barring a specific class or classes, the barred UEs are randomly selected. Moreover, in order to allow emergency services and operator to still have access to the network in congestion situations, special access classes are used by those UEs such that they are not barred from access.

The main drawback of this mechanism is that it is intended for use during certain rarely occurring events. Consequently, the number of Access Classes is kept small. It is not practical to increase the number of Access Classes, for example to provide a special access class for MTC devices, as this would require a significant adjustment to the UE SIM and significantly increased communications overheads. Also, Access Class Barring is currently designed to prevent access to the network completely, whereas it is desirable that MTC devices access network regularly.

A third approach is to program the MTC devices to send their data at different times. However, considering the large number of devices and the lack of time synchronisation among the devices, the burden of such a solution would be on the end user. It is impractical to expect the end user to take any measures to protect the cellular network. Instead, it is desirable for the network to adapt itself to the devices. In view of the foregoing, this presents a significant challenge, if it is to be achieved without adding significant further communication overheads to the data traffic between the network and UEs.

SUMMARY OF THE INVENTION

According to the system described herein, a method is provided for controlling a plurality of UEs in a cellular network, particularly MTC devices, to spread out their transmissions over the Random Access Channel (RACH) of the cellular network over time, whilst allowing the UE to access the cellular network eventually. The messages may be spread out in time irrespective of a time configured at each MTC device (usually at the application layer) for sending data to the network which in turn triggers a transmission over the RACH. This mitigates the problem of uncontrollable peaks in the RACH intensity (the number of RACH attempts per unit time). To achieve this, the system described herein provides mechanisms at the Radio Access Network (RAN) level to control access by MTC devices to the network.

MTC devices may be characterised in that their transmissions are time-controlled. Moreover, the data traffic that they transmit is typically delay-tolerant. The main motivation for the operator to keep such control over MTC devices is to prevent them from sending their data in a time synchronised manner and at times when the network is already congested in order to protect the normal non-MTC UE population.

Controlling access by a User Equipment (UE) with data to send to a cellular network may be effected by: receiving an instruction at the UE from a base station of the cellular network regarding transmission by the UE over a Random Access Channel (RACH) of the cellular network; and controlling when transmissions are made from the UE over the RACH, on the basis of the received instruction. As will be explained below, a transmission over the RACH may be made in response to the received instruction in some cases. Here, the instruction gives permission for the UE to make an access to the network if it has data to transmit. The UE may not be allowed to make an access for the purpose of sending data otherwise. The instruction may further specify a Group Identifier, which is compared with a Group Identifier specific to the UE and transmission over the RACH may be avoided based on the comparison. The UE may avoid transmission over the RACH even if it has data to transmit to the network.

In a first aspect, there is provided a method of controlling access by a User Equipment (UE) to a cellular network. The method comprises: receiving an instruction at the UE from a base station of the cellular network to make a transmission from the UE over a Random Access Channel, RACH, of the cellular network; and making a transmission from the UE over the RACH in response to the received instruction, if the UE has data to send over the cellular network, in order to send this data. It will be appreciated that the instruction from the base station advantageously gives permission for the UE to make a transmission over the RACH. The method may further comprise deciding at the UE to make a transmission over the RACH on the basis that the UE has data to send. This step may further comprise deciding at the UE when to make a transmission over the RACH. Alternatively, the method may further comprise deciding at the UE not to make a transmission over the RACH on the basis that the UE has no data to send.

Existing approaches for accessing the network using the RACH are based on the UE accessing the RACH randomly when it has data to send, without any foreknowledge by the network. The approach of this aspect differs fundamentally in that the network instructs the UE about the timing of transmissions over the RACH and the UE does not autonomously initiate access for data transfer. This removes a significant part of randomisation within the random access procedure, since each UE receives an instruction about when or in which time window they can transmit over the RACH.

The system described herein may also be found in a User Equipment (UE) for a cellular network. The UE comprises: a receiver, arranged to receive an instruction from a base station of the cellular network to make a transmission over a Random Access Channel, RACH, of the cellular network; a transmitter for transmitting over the RACH; and a processor, configured to control the transmitter to transmit over the RACH in response to the received instruction, if the UE has data to send over the cellular network, in order to send this data.

Additionally or alternatively, the system described herein may be embodied in a method of controlling access by a User Equipment (UE) to a cellular network. The method comprises: transmitting an instruction to the UE from a base station of the cellular network, the instruction commanding the UE to make a transmission from the UE over a Random Access Channel, RACH, of the cellular network in order for the UE to send data over the cellular network.

In this approach, the UE is effectively paged to make a transmission over the RACH. Normally, the purpose of the RACH procedure is to allow access to the network when that access is not expected by the base station. In contrast, paging is typically used by the base station to cause a UE to access the network when the UE is not expecting this access, especially for mobile terminating calls. However, this approach combines paging and random access, in view of the large numbers of UEs trying to access the network at any one time. This method is applied to UE-originating data. Paging allows the network to control how many UEs access the network at a given time, without forcing the UE to access the network (for example, when that UE has no data to send). Thus, the network does not control every aspect of the network access, but simply invites the UE to access the network. However, it may be understood that autonomous access by those devices may be deactivated for the purpose of sending data (access for signalling purposes would still be allowed), such that they can only access for the purpose of sending data in response to a paging request from the network.

In any of the above aspects, there are a number of optional features. These are now described with respect to the first method of controlling access by a UE to a cellular network described above. Nevertheless, it will be appreciated that these can be applied to any of these aspects.

In an embodiment, the instruction is a paging message. Hence, this approach can fit directly into the paging message framework set up within existing standards. An MTC device may have capabilities to provide a specific handling of the paging message.

This approach can additionally or alternatively be improved by grouping UEs together and inviting a group of UEs to access the network at a given time. Then, the UE has an associated Group Identifier. In such cases, the method further comprises comparing the specified Group Identifier and the Group Identifier associated with the UE. Then, the step of making a transmission from the UE over the RACH may be based on the comparison. This also allows the base station to identify multiple UEs using fewer overhead bits in the invitation (paging message). Optionally, the instruction may identify a group of temporary identifiers associated with the Group Identifier. Then, the step of making a transmission from the UE over the RACH may use one of the received associated temporary identifiers.

The Group Identifier (ID) allows the network to divide the population of UEs into groups, including random groups. This division of UEs can prevent a large number from transmitting over the RACH at the same time. Additionally or alternatively, it can allow one instruction to be made applicable to multiple UEs, but not all of the UEs. This is particularly advantageous when the number of UEs in a cell is high.

The Group ID is known by each UE. However, it can obtain this information in different ways. In one approach, the method further comprises transmitting the Group Identifier associated with the UE from a base station of the cellular network to the UE. In other words, the Group ID is provided to the UE by the network. Alternatively, the method may further comprise determining the Group Identifier associated with the UE, at the UE, based on an identifier specific to the UE or to a Subscriber Identity Module (SIM) or Universal Subscriber Identity Module (USIM) associated with the UE. For example, the identifier specific to the UE, SIM or USIM may be an International Mobile Equipment Identity (IMEI) or an International Mobile Subscriber Identity (IMSI). The IMSI may be stored on the SIM or USIM.

The UE could determine the Group ID based on the identifier specific to the UE, SIM or USIM by using a known relationship, such as an algorithm or a look-up table. For example, the base station may broadcast an integer index which is used by the UE to determine its Group ID using a modulo operation. Additionally, the base station may broadcast a specific Group ID or a bit map indicating which Group ID or IDs from 0 up to the integer (index-1) is allowed or not allowed access at the specific time.

Advantageously, improvement can be achieved by limiting the temporary identifiers that can be used by UEs invited by the base station to access the network. Temporary identifiers (for example, a preamble) allow the UE to identify itself on the Random Access Channel, before network access. In this improvement, the method may further comprise: receiving a plurality of temporary identifiers at the UE, each temporary identifier being suitable for identifying transmissions from a UE over the RACH; and selecting a temporary identifier at the UE from a subset of the plurality of temporary identifiers. The step of controlling when transmissions are made comprises making a transmission from the UE over the RACH then using the selected temporary identifier. The subset comprises fewer temporary identifiers than the received plurality of temporary identifiers. Beneficially, the plurality of temporary identifiers received at the UE are transmitted (or broadcast) by the base station.

In one embodiment, the instruction received at the UE provides an indication of a temporary identifier suitable for identifying transmissions from a UE over the RACH. Then, the step of controlling when transmissions are made may comprise making a transmission from the UE over the RACH using the temporary identifier indicated by the instruction. In this embodiment, the base station provides a dedicated temporary identifier or preamble to each UE that is invited to access the network.

If more than one UE transmits on the RACH at the same time, collisions may occur resulting in interference on the RACH and failure by the base station to receive any transmissions. This problem can be mitigated in a number of ways. In one embodiment, the method further comprises delaying between receipt of the instruction and the step of making a transmission over the RACH for a period of time of random duration. This period of time may be set to be random up to a maximum value, wherein the maximum value may be received from the network. This random back-off approach causes the UE to delay transmission over the RACH for a random period of time following receipt of the invitation to access the network. Hence, multiple UEs are less likely to transmit simultaneously and the probability of a collision is reduced. Optionally, the random duration may be determined by the UE on the basis of one or more of: a number of temporary identifiers available for identifying transmissions from a UE over the RACH; and a maximum time duration. The maximum time duration may be indicated by the network.

Optionally, the instruction may comprise a repetition indication. Then, the method may further comprise: transmitting a repeat of the instruction to the UE from the base station; and wherein the repeat of the instruction is identical to the instruction except in respect of the repetition indication. The repetition indication can be used for a number of reasons. In one respect, it can be used to repeat the instruction in case a UE did not receive it. Alternatively, it can be used as a way to sub-divide further the group of UEs having the same Group ID. This can be done by causing only some of the UEs having the same Group identifier to access the network in response to the invitation. The UEs which access the network in response to the invitation are determined on the basis of the repetition indication.

The instruction may be a first instruction and the method may further comprise: transmitting a second instruction to make a transmission over a Random Access Channel, RACH, of the cellular network to the UE, from the base station. Then, the step of transmitting a second instruction may take place a period of time after the step of transmitting the first instruction, the period of time being at least of a predetermined duration. Advantageously, the predetermined duration is determined on the basis of a number of User Equipment registered with the base station of a specific type. The specific type is optionally based on one or more of: the device application; the device status as an MTC device; and one or more device data traffic characteristics.

In a further aspect of the system described herein, an instruction may be used to command UEs to avoid transmitting over the RACH. The UE has an associated Group Identifier that is distinct from an Access Class associated with the UE. The method comprises: receiving an instruction at the UE from a base station of the cellular network to make a transmission from the UE over a Random Access Channel (RACH) of the cellular network, the instruction further specifying a Group Identifier; comparing, at the UE, the Group Identifier specified by the instruction with the Group Identifier associated with the UE; and avoiding making a transmission from the UE over the RACH for a period of time based on the result of the step of comparing.

This approach enhances the existing Access Class barring mechanism to cope with MTC devices. The MTC devices are grouped using a Group Identifier (ID), which is distinct from the Access Class. The base station identifies a Group ID for barring purposes. Then in one embodiment, the step of controlling when transmissions are made may comprise avoiding the UE transmitting over the RACH if the specified Group Identifier is not the same as the Group identifier associated with the UE. In other words, only UEs having the identified Group ID are able to transmit over the RACH. In another embodiment, the step of controlling when transmissions are made may comprise avoiding the UE transmitting over the RACH if the specified Group Identifier is the same as the Group identifier associated with the UE. It will be understood that more than one Group ID could be identified by the base station or that the comparison could involve comparative steps other than equal to or not equal to (for example, greater than or less than could be used).

Advantageously, the Group Identifier associated with the UE is independent from the Access Class associated with the UE. Alternatively, there may be some connection between the Group Identifier and the Access Class.

The method may use the Access Class as well as the Group ID. In an embodiment to achieve this, the instruction further specifies an Access Class and commands the UE to compare the specified Access Class with Access Class associated with the UE and to avoid transmitting over the RACH based on the comparison of the Group Identifier and the comparison of the Access Class.

The Group ID is known by each UE. However, it can obtain this information in different ways. These ways are outlined above, with reference to the earlier aspect of the system described herein.

In an embodiment, the instruction to the UE forms part of a System Information broadcast by the base station. When the instruction to the UE forms part of the System Information broadcast by the base station, this conforms with the approach taken in known Access Class barring.

Optionally, in the step of avoiding transmissions from the UE over the RACH for a period of time based on the comparison, the period of time is predetermined or specified in the instruction. The period of time could be a multiple of radio frames.

The system described herein may also be found in a User Equipment, UE, for a cellular network. The UE has an associated Group Identifier that is distinct from an Access Class associated with the UE. Then, the UE comprises a processor configured to receive an instruction from a base station of the cellular network, the instruction specifying a Group Identifier, and further configured to compare the specified Group Identifier and the Group Identifier associated with the UE and to control the UE to avoid transmissions over a Random Access Channel (RACH) of the cellular network based on the comparison. The UE may additionally comprise features arranged to implement any of the features described with reference to the method of control detailed herein.

The system described herein may also be found in a method of controlling a User Equipment (UE) to access a cellular network, comprising transmitting an instruction to the UE from a base station of the cellular network in order to effect the method described above or herein.

In any of the above aspects of the system described herein (whether a method or a device), the UE may be a Machine Type Communication (MTC) device. The advantages specific to MTC devices in particular will be apparent from the above. The term MTC device is now well-known within the telecommunications industry, but it will be understood that MTC device have one or more of the following characteristics: carry data (that is, non-voice) traffic only; have low data traffic volume; low frequency of network access; synchronised access with one or more other MTC devices; and are intended to transmit data to a remote processor without human intervention. This technique is particularly advantageous where the UE uses a Universal Mobile Telecommunications System (UMTS) or Long Term Evolution (LTE) Radio Access Technology. The Radio Access Technology is used to effect the method as described above.

In a further aspect, there is provided by the system described herein a method of controlling a User Equipment (UE) in a cellular network. Here, the UE is a Machine Type Communication device. The method comprises: receiving a plurality of temporary identifiers at the UE, each temporary identifier being suitable for identifying transmissions from a respective UE over a Random Access Channel, RACH, of the cellular network; selecting a temporary identifier at the UE from a subset of the plurality of temporary identifiers, the subset being designated for User Equipment employing Machine Type Communication; and transmitting from the UE over the RACH using the selected temporary identifier. The plurality of temporary identifiers received at the UE may be transmitted (or broadcast) by the base station. In an embodiment, each of the plurality of temporary identifiers is preamble sequence.

Temporary identifiers (for example, a preamble) allow the UE to identify itself on the Random Access Channel, before network access. There are significant advantages to limiting the temporary identifiers that MTC devices can use to access the network. Allowing these UEs to select from only a subset (comprising fewer temporary identifiers than the received plurality of temporary identifiers) means that other temporary identifiers are available for other UEs. Hence, their access to the network may be improved. This technique is particularly advantageous where the UE uses a Universal Mobile Telecommunications System (UMTS) or Long Term Evolution (LTE) Radio Access Technology.

The subset can be determined in a number of ways. Optionally, the method further comprises receiving an indication of the subset of the plurality of temporary identifiers designated for User Equipment employing Machine Type Communication from a base station of the cellular network. Then, the subset is identified by the base station. Alternatively, the subset can be determined by the MTC device UE, based on a rule, algorithm or lookup table.

This approach can also be combined with grouping the UEs and allowing only a group of the UEs to use the RACH at one time. In such an approach, the UE may have an associated Group Identifier and the method further comprises: receiving an instruction from a base station of the cellular network, the instruction specifying a Group Identifier; and comparing the specified Group Identifier and the Group Identifier associated with the UE. Then, the step of transmitting from the UE over the RACH may be based on the comparison.

If more than one UE transmits on the RACH at the same time, collisions may occur resulting in interference on the RACH and failure by the base station to receive any transmissions. In an approach to mitigate this problem, in which the UE is configured to transmit over the RACH at a predetermined time, the method may further comprise delaying between the predetermined time and the step of transmitting over the RACH for a period of time of random duration. This random back-off approach causes the UE to delay transmission over the RACH for a random period of time following receipt of the invitation to access the network. Hence, multiple UEs are less likely to transmit simultaneously and the probability of a collision is reduced. Optionally, the random duration may be determined by the UE on the basis of one or more of: a number of temporary identifiers available for identifying transmissions from a UE over the RACH; and a maximum time duration.

The system described herein may also be found in a User Equipment (UE) for a cellular network that is a Machine Type Communication device. The UE comprises: a receiver, arranged to receive a plurality of temporary identifiers, each temporary identifier being suitable for identifying transmissions from a respective UE over a Random Access Channel, RACH, of the cellular network; a processor, configured to select a temporary identifier from a subset of the plurality of temporary identifiers, the subset being designated for User Equipment employing Machine Type Communication; and a transmitter, arranged to transmit over the RACH using the selected temporary identifier. The UE may additionally comprise features arranged to implement any of the features described with reference to the method of control detailed herein.

In another aspect of the system described herein, there may be provided a computer program, configured when operated on a processor to carry out any of the methods described herein. The computer program may be split in its functionality over different logical or geographical entities within or connected to the cellular network. Additionally or alternatively, the system described herein may be implemented in any combination of hardware, software, programmable logic or another electronic system.

It will also be understood that the system described herein is not limited to the specific combinations of features explicitly disclosed, but also any combination of features that are described independently and which the skilled person could implement together.

BRIEF DESCRIPTION OF THE DRAWINGS

Embodiments of the system described herein will now be explained by way of example only, with reference to the accompanying drawings in which.

DETAILED DESCRIPTION OF VARIOUS EMBODIMENTS

Figure 1:
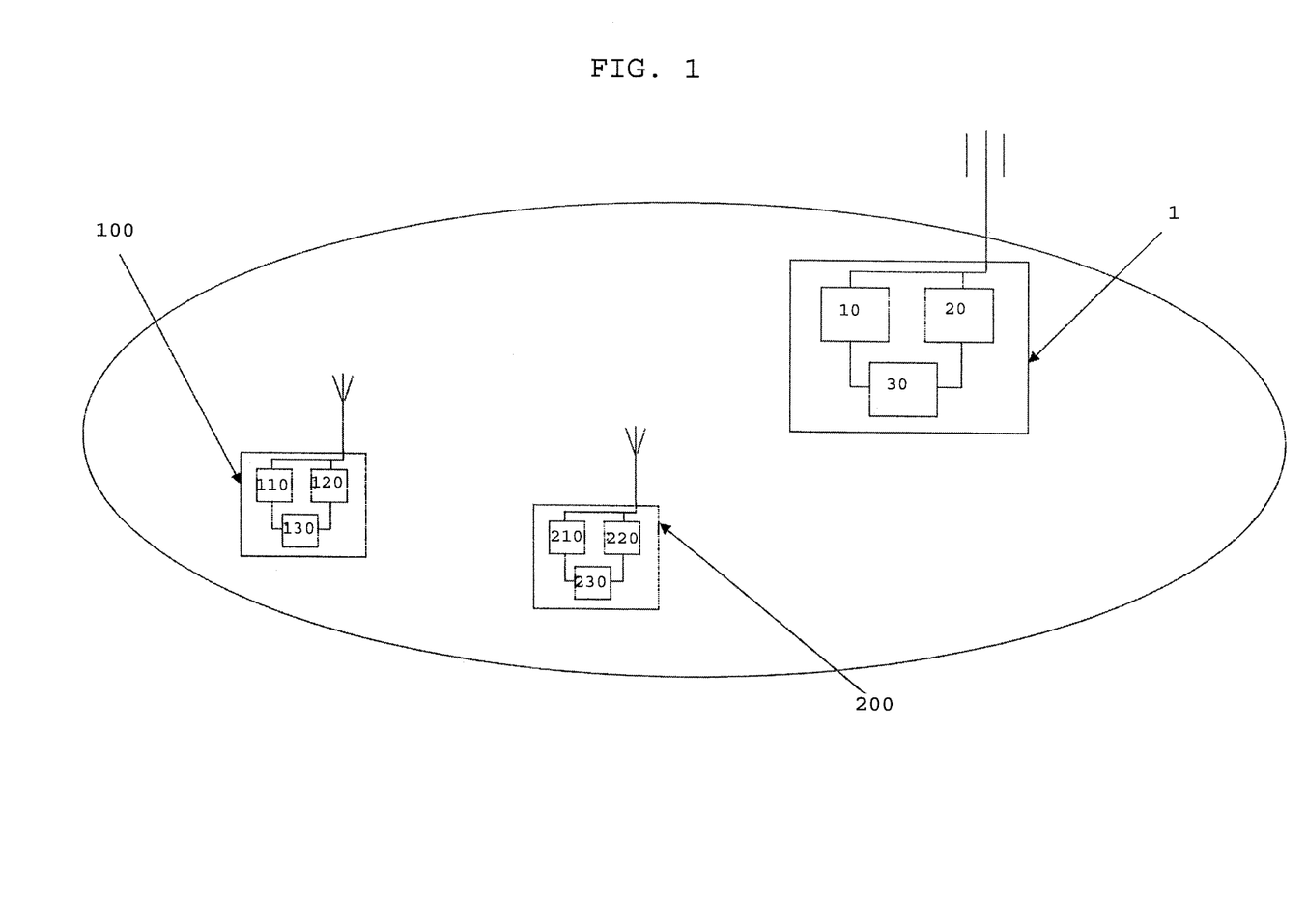
FIG. 1 shows a schematic diagram detailing an example configuration of MTC devices in a cellular network.

Referring first to FIG. 1, there is shown a schematic diagram detailing an example configuration of MTC devices in a cellular network. There is provided: a base station 1; a first MTC device 100; and a second MTC device 200.

The base station 1 may be GSM base station, a UMTS Node B, an LTE eNode B or any other cellular network base station device. The base station 1 comprises: a transmitter 10; a receiver 20; and a processor 30. Similarly, the first MTC device 100 is a UE comprising a transmitter 110; a receiver 120; and a processor 130 and the second MTC device 200 is a UE comprising a transmitter 210; a receiver 220; and a processor 130. It will be understood that the base station 1, first MTC device 100 and second MTC device 200 also comprise other hardware, software or both in order to carry out their functions.

A number of different approaches are now described for controlling the first MTC device 100, second MTC device 200 or both in order to restrict their transmissions over the RACH of the cellular network to the base station 1.

Enhanced Barring Mechanism

Using an Access Class to bar MTC devices from transmission over the RACH may not be practical. However, an improvement to Access Class barring to implement barring for MTC devices is now described.

Rather than using the Access Class defined for each UE, including MTC devices, this approach additionally or alternatively uses a Group. Identifier (Group ID), which is distinct from the Access Class. If a large number of MTC devices (for example smart utility meters) are expected to generate RACH attempts at the same time, the MTC device population is divided into a number of groups. Each UE, or each UE that is an MTC device, has an associated Group ID.

The network, through the base station 1, signals a one or more Group IDs for which Access Class barring applies or does not apply. The Group ID may be used in addition to or instead of the Access Class. The base station 1 thereby can keep control on how MTC devices access the network. For example, if the MTC devices are divided into N groups, the network can allow each group in turn to access it over a certain time period (known as an access-barring time).

MTC devices that are allowed to access the network during the barring time period randomly back-off over that time to access the network. A randomisation function is used by each MTC device to delay its transmission over the period over which they are allowed access. This spreads the RACH attempts by the different MTC devices over time.

The Group ID can be provided to each UE by the network (via the base station) or it can be programmed or fixed in the UE or UE SIM/USIM by the network operator. However, an alternative simple grouping can be implemented, based on the UE IMSI. A similar approach is taken for grouping UEs into paging groups, as defined in 3GPP TS 36.304, which is incorporated herein by reference. Here, the UE paging frame is identified by the following formula:

$$SFN \bmod T = (T \operatorname{div} N)*(UE\_ID \bmod N).$$

In order for an MTC device to identify whether barring applies to it or not, the network broadcasts the number of groups, G, and a BIT STRING of size G which identifies which group or groups of MTC devices can access the network. To formulate this BIT STRING, g corresponds to the gth bit in the bitmap and is a value in the range 0 to G-1. Then, $$g = UE\_ID \bmod G,$$

where UE_ID is an identifier specific to the UE, particularly the UE IMSI.

An advantage of this technique is that it avoids the need for an explicit Group Identifier to be coded in the MTC device or SIM, which can be a configuration burden. Instead, the existing UE ID, such as the IMSI, is used by UE to determine whether it is barred from random access or not. MTC devices apply this extended access class barring based on a configuration that identifies the UE as an MTC device.

In a slightly different approach, MTC devices with similar characteristics could be grouped together. In another alternative, a Group ID could be a special IMSI allocated to a group of MTC devices.

This approach uses broadcast System Information to command UEs appropriately. Frequent change of System Information is undesirable, because it would require all UEs in the system to read the System Information at each change. However, it is under the network's control to decide how access control is done for groups of MTC devices and how often the barring is modified. Hence, the effect of frequent System Information change can be minimised by the operator.

The Group ID can be an explicit value stored in the UE or an ID derived from the UE ID and the total number of groups signalled by the network.

This enhanced barring approach provides more flexibility over the existing Access Class barring mechanism by allowing operator to divide MTC devices in an appropriate number of groups to smooth out the RACH intensity.

Example: System Information Block

An example signalling of the parameters is now shown. The Information Element (IE) SystemInformationBlockType2 in LTE contains radio resource configuration information that is common for all UEs. UE timers and constants related to functionality for which parameters are provided in another System Information Block (SIB) are included in the corresponding SIB.

```
-- ASN1START
SystemInformationBlockType2 ::=         SEQUENCE {
    ac-BarringInfo                          SEQUENCE {
        ac-BarringForEmergency                  BOOLEAN,
        ac-BarringForMO-Signalling              AC-BarringConfig
                                                    OPTIONAL, -- Need OP
        ac-BarringForMO-Data                    AC-BarringConfig
                                                    OPTIONAL -- Need OP
        ac-barringForMTC                        AC-BarringConfigMTC
                                                    OPTIONAL -- Need OP
```

```
}                                               OPTIONAL, -- Need OP
    radioResourceConfigCommon
    RadioResourceConfigCommonSIB,
    ue-TimersAndConstants                       UE-TimersAndConstants,
    freqInfo                                    SEQUENCE {
        ul-CarrierFreq                              ARFCN-ValueEUTRA
                                                    OPTIONAL, -- Need OP
        ul-Bandwidth                                ENUMERATED {n6, n15, n25,
n50, n75, n100}
                                                    OPTIONAL, -- Need OP
        additionalSpectrumEmission
        AdditionalSpectrumEmission
    },
    mbsfn-SubframeConfigList                    MBSFN-SubframeConfigList
                                                    OPTIONAL, -- Need OR
    timeAlignmentTimerCommon                    TimeAlignmentTimer,
    ...
}
AC-BarringConfig ::=                            SEQUENCE {
    ac-BarringFactor                                ENUMERATED {
                p00, p05, p10, p15, p20, p25, p30, p40,
                p50, p60, p70, p75, p80, p85, p90, p95},
    ac-BarringTime                                  ENUMERATED {s4, s8, s16,
s32, s64, s128, s256, s512},
    ac-BarringForSpecialAC                          BIT STRING (SIZE(5))
}
AC-BarringConfigMTC ::=                         SEQUENCE {
    ac-BarringFactor                                ENUMERATED {
                p00, p05, p10, p15, p20, p25, p30, p40,
                p50, p60, p70, p75, p80, p85, p90, p95},
    ac-BarringTime                                  ENUMERATED {s4, s8, s16,
s32, s64, s128, s256, s512,s1024, s2048,
s4096,s8192,FFS},
    NumberOfMTCGroups                               INTEGER(1..N)
    ac-barringForMTCGroup                           BIT STRING (SIZEN))
}
MBSFN-SubframeConfigList ::=                    SEQUENCE (SIZE (1..maxMBSFN-
Allocations)) OF MBSFN-SubframeConfig
MBSFN-SubframeConfig ::=                        SEQUENCE {
    radioframeAllocationPeriod                      ENUMERATED {n1, n2, n4,
n8, n16, n32},
    radioframeAllocationOffset                      INTEGER (0..7),
    subframeAllocation                              CHOICE {
        oneFrame                                    BIT STRING (SIZE(6)),
        fourFrames                                  BIT STRING (SIZE(24))
    }
}
-- ASN1STOP
```

RACH Preamble Reservation

An operator can reserve a group of preambles dedicated for use by certain MTC devices. This is possible because only 16 out of the 64 dedicated preambles (in LTC) might be required to achieve a 1% collision probability with 2.5% of physical layer resources reserved for the Physical RACH (PRACH).

In existing systems, two groups of RACH preambles are broadcast in the System Information Block 2 (SIB2) of LTE. The broadcast preambles can be used by all UEs in the cell. In this approach, a third group of RACH preambles is broadcast for MTC devices. Only a certain class of MTC devices can use these preambles, specifically those with potential to generate a high RACH intensity, such as smart meters.

These MTC devices have functionality which allows them to use this third group of preambles. Whenever an MTC device has to access the network, it restricts itself to preambles belonging to this third group. This protects the remaining UE population from surges of RACH attempts which can be created by a this class of MTC devices.

MTC devices may still generate their RACH attempts in a synchronised manner (for example, simultaneously). However, since these devices produce delay-tolerant traffic, the MTC devices may back off randomly over a certain time before sending their RACH attempts. The maximum back off time can be network controlled (and specified in a broadcast message). In this way, the network can spread the RACH attempts over a certain time period and avoid peaks in RACH intensity. Random back-off can of course be applied with the other approaches discussed above and below.

Moreover, MTC devices can be classed into a number of groups, as discussed above. Then, the network can decide which group is allowed to use the set of preambles at any point in time by broadcasting a group identifier together with the preambles.

For example, smart meters might be expected to send their reading at say 10.00 a.m. over a period of one hour. If smart meters have a Group ID of X, the network can broadcast a group of say 14 preambles for use by the smart meters, a group identity X and a randomisation time of say 1 hour. Then, smart meters will try to send their reading over the next hour using only the group of dedicated preambles and not impact the remaining UE population.

The benefit of this mechanism is that it provides the network with more flexibility to provide a set of preambles to a specific group of MTC devices to access the network over a certain time.

Example: System Information Block 2

The parameters are broadcast in the SIB2. An example of the signalling impact is as follows:

```
RACH-ConfigCommon ::=           SEQUENCE {
    preambleInfo                    SEQUENCE {
        numberOfRA-Preambles            ENUMERATED {
                n4, n8, n12, n16 ,n20, n24, n28,
                n32, n36, n40, n44, n48, n52, n56,
                                                n60, n64},
        preamblesGroupAConfig           SEQUENCE {
            sizeOfRA-PreamblesGroupA        ENUMERATED {
                n4, n8, n12, n16 ,n20, n24, n28,
                n32, n36, n40, n44, n48, n52, n56,
                                                n60},
        messageSizeGroupA
    ENUMERATED {b56, b144, b208, b256},
            messagePowerOffsetGroupB        ENUMERATED {
            minusinfinity, dB0, dB5, dB8, dB10, dB12,
                                                dB15, dB18},
        ...
    }                               OPTIONAL        -- Need
    preamblesGroupCConfig           SEQUENCE {
        sizeOfRA-PreamblesGroupC        ENUMERATED {
                n4, n8, n12, n16 ,n20, n24, n28,
                n32, n36, n40, n44, n48, n52, n56,
                                                },
        GroupIdentity                   INTEGER (0..FFS)
        Randomisation time period   ENUMERATED {FFS}
OPTIONAL
        ...
    }                               OPTIONAL        -- Need
OP
    },
```

Paging MTC Devices

In many cases, the network (for example, an MTC server) knows when data is available for sending from the MTC device (for instance, smart meters are expected to provide a reading once every hour). Then, rather than an MTC device initiating the RACH procedure to send its data, the network can initiate the connection instead. As discussed above, a sudden surge in RACH attempts by many MTC devices might be detrimental for access by other UEs (if sharing the same set of RACH preambles) or by other MTC devices (if sharing a set of RACH preambles reserved for MTC devices).

The network can 'pull' the data from the MTC devices in a controlled manner. One way of achieving this is for network to page one or more MTC devices. In particular, one or more dedicated preambles may be provided by the network, which the MTC device or devices can use to access the network (depending on the capacity of the paging message and the availability of RACH preambles).

Figure 2:
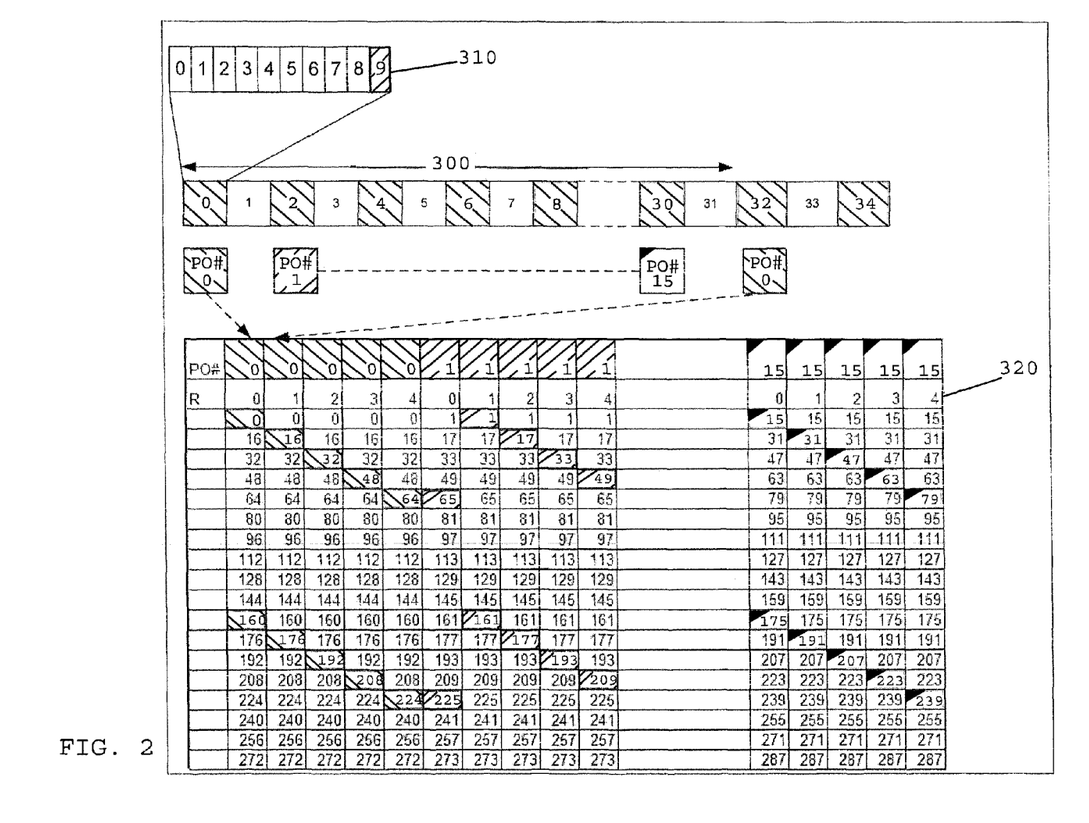
FIG. 2 schematically depicts paging transmissions to MTC devices in the cellular network such as shown in FIG. 1, according to an embodiment of the system described herein.

The paging mechanism already provides a way to spread UEs across paging occasions according to their UE Identifiers. Referring to FIG. 2, there is shown a schematic depiction of paging transmissions to MTC devices in the cellular network. In this example, the default paging cycle (T) is 32 radio frames and, as defined in 3GPP TS 36.304, nB=T/2 (this indicates that UE is only paged in alternate radio frames and each radio frame has only one paging subframe).

For the specific example of FIG. 2, a paging frame 300 is shown, with sub-frames 310 numbered from 0 to 9. Then, table 320 shows the UE ID numbers paged at each paging occasion (labelled PO#). As will be explained below, the paging message may be repeated 4 times and these are numbered R={0, 1, 2, 3, 4}. For example, in the first paging occasion, the network can page MTC devices with UE ID #16, #32 and #48 together with a dedicated preamble for each UE ID.

A system with 5 MHz bandwidth can accommodate 4 UE IMSI details per paging message. Taking into account the overhead of sending a dedicated preamble for each UE ID, the capacity in each paging message is reduced from 4 to 3 UEs.

If the network is going to reuse the 3 preambles sent in Radio frame #0, it is desirable that all paged UEs finish their RACH transmission before the network pages the next batch of MTC devices at Radio Frame #2 providing the same preambles. One approach to achieve this is for the network to page MTC devices in a different radio frame of paging cycle in each paging cycle. For example in one paging cycle, the network may page MTC devices in Radio Frame numbers 0, 4, 8, 12 etc. and in the next paging cycle, the network may page MTC devices in Radio Frame numbers 2, 6, 10 etc. In this way, the MTC devices have more time to complete the RACH procedure until the next group of MTC devices are paged using the same set of dedicated preambles.

The number of smart meters per cell may be as high as 107000 (assuming 3 meters per household). If we have 16 paging groups, according to the example configuration in FIG. 2, this results in 6700 MTC devices per paging group. This means that network requires 4460 paging cycles (approximately 24 minutes in LTE) to send the MTC devices in the cell, assuming consecutive groups are paged in alternate paging cycles.

A key advantage of using this deterministic approach is that the network has control of how MTC devices send their data, thereby avoiding a peak in RACH traffic on the uplink. Also, the network does not have to reserve a large number of RACH preambles for use by MTC devices. On the other hand, this approach increases the paging load on the downlink. For the example configuration shown in FIG. 2, there is an additional paging load of 50 pages per second over the 24 minutes period. For a configuration of nB=T/2, the supported paging load may be 176 pages/s. Even though the network can prioritise paging for the non-MTC UE population over paging for MTC devices with delay tolerant traffic like smart meters, the scheme introduces a significant increase in paging load.

An advantage of this mechanism is that the network has full control over which devices access the network at which time, by increasing the paging data traffic load.

Example: Paging Message

An example of how the paging message is modified is given below. The Paging message is used for the notification of one or more UEs. The message details are:

Signalling radio bearer: N/A; RLC-SAP: TM; Logical channel: PCCH; and Direction: E UTRAN to UE.

The Paging message is below.

```
-- ASN1START
Paging ::=                      SEQUENCE {
    pagingRecordList
    PagingRecordList                OPTIONAL, -- Need ON
    systemInfoModification          ENUMERATED {true}
                                    OPTIONAL, -- Need ON
    etws-Indication                 ENUMERATED {true}
                                    OPTIONAL, -- Need ON
    MTC-Indication                  ENUMERATED {true}
                                    OPTIONAL, -- Need ON
    nonCriticalExtension            Paging-v9x0-IEs
                                    OPTIONAL -- Need OP
}
Paging-v9x0-IEs ::=         SEQUENCE {
    cmas-Indication-r9              ENUMERATED {true}
                                    OPTIONAL, -- Need ON
    nonCriticalExtension            SEQUENCE { }
                                    OPTIONAL -- Need OP
}
PagingRecordList ::=            SEQUENCE (SIZE
(1..maxPageRec)) OF PagingRecord
PagingRecord ::=                SEQUENCE {
    ue-Identity                     PagingUE-Identity,
    cn-Domain                       ENUMERATED      {ps, cs},
```

-continued

| Preamble-number | INTEGER (1..64) |
|---|---|
| ... | |
| } | |
| PagingUE-Identity ::= | CHOICE { |
| s-TMSI | S-TMSI, |
| imsi | IMSI, |
| ... | |
| } | |
| IMSI ::= | SEQUENCE (SIZE |
| (6..21)) OF IMSI-Digit | |
| IMSI-Digit::= | INTEGER (0..9) |
| -- ASN1STOP | |

Using a Group ID for Paging MTC Devices

As explained above, one-to-one paging of MTC devices, providing each with a dedicated preamble, may lead to a high level of paging traffic load. It may be possible to reduce the paging load by using a Group identifier (ID) to identify a group of MTC devices within a paging group for which a set of dedicated preambles apply.

Group Identifiers have been discussed above with reference to the enhanced barring mechanism. Considering the limited capacity of the paging channel, an optimised signalling of the preambles for MTC devices in the group would be desirable. One possibility is to signal a group of preambles based on an offset from the already broadcast set of preambles (for non-MTC UEs). For example, the network can provide a start offset (start offset) to the group of MTC devices, which have already received the number of preambles (number-OfRA-Preambles) in system information broadcast for the cell and the number of preambles reserved for MTC devices belonging to the targeted group (numberPagedPreambles). Using this information, the MTC device can establish the set of preambles from which it can choose to make an initial access. The first valid preamble will be given by number-OfRA-Preambles+start_offset. For example, if number-OfRA-Preambles=16, start_offest=6 and numberPagedPreambles=5, the paged preambles are numbered 22, 23, 24, 25 and 26. The start_offset could be coded with 6 bits and the number of preambles also with 6 bits. Assuming a Group ID of same size as an IMSI, the total paging message size would likely be around 73 bits.

When an MTC devices reactivates (wakes up) at the paging occasion, only those MTC devices with the paged Group ID take further action. Other UEs (including normal UEs and MTC devices not belonging to the group) will ignore the paging message.

Figure 3:
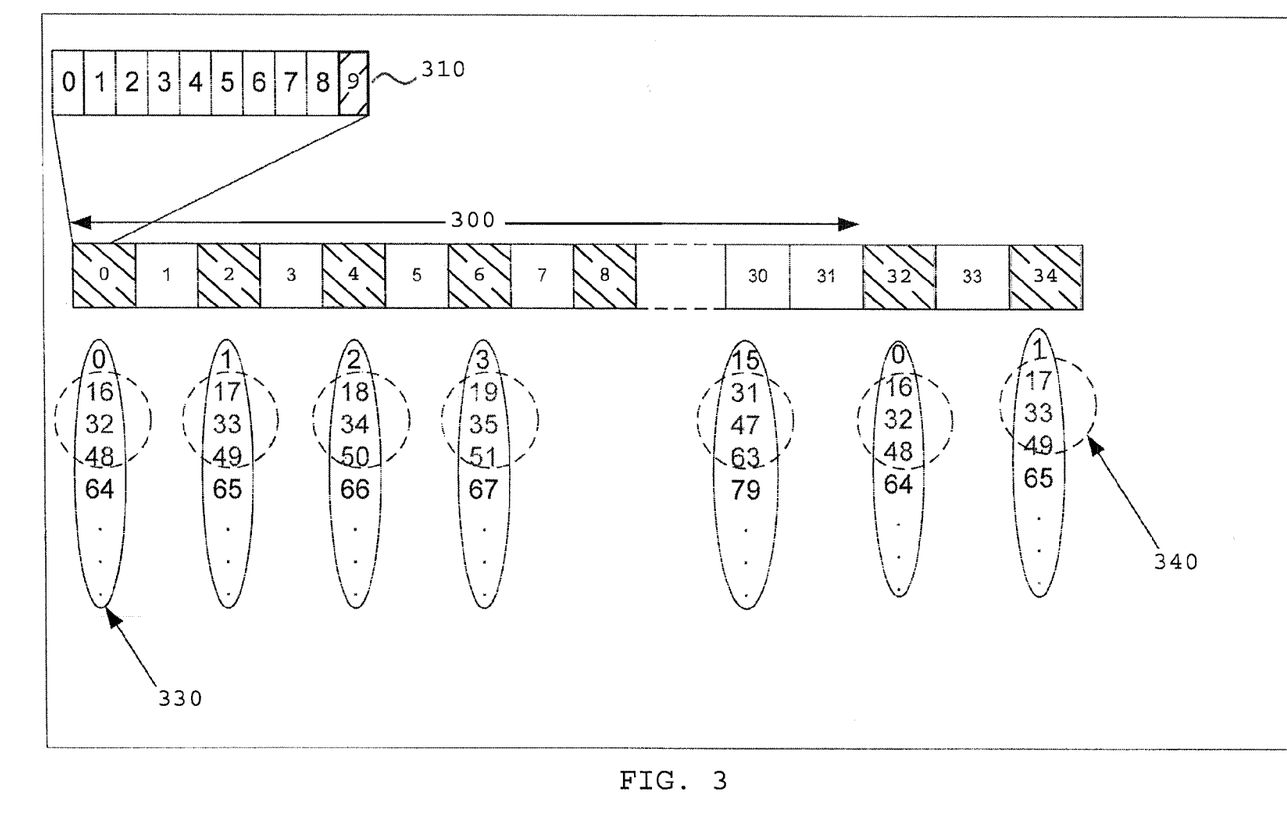
FIG. 3 illustrates schematically grouping of MTC devices in the cellular network such as shown in FIG. 1, according to another embodiment of the system described herein.

Referring now to FIG. 3, there is shown a schematic illustration of grouping MTC devices in the cellular network. Where the same features are shown as in FIG. 2, identical reference numerals are used. A paging message 330 is shown for illustrative purposes.

In this case, UEs numbered 0 to 79 and 160 to 239 are all allocated to Group 'X' and UEs numbered 80 to 159 and 240 to 287 are all allocated to Group 'Y'. A Group ID could be used by the network to identify the respective Group for each UE. Only those UEs allocated in that Group will act on the received paging message 330 in paging occasion #0 along Radio Frame 300. In FIG. 3, the Group of UEs identified is shown as Group 340.

With this scheme, multiple MTC devices with the same Group ID may use one of the indicated preambles to contend for access on the RACH. There may be more MTC devices with the same Group ID than dedicated preambles. To allow this situation to work, the MTC devices could initially randomly choose one of the paged preambles, in a similar way to a conventional RACH procedure. However, the collision probability may still be high even in this situation.

Another way to avoid the collision is to spread the RACH attempts over time, for example by causing the MTC device to delay (back off) for a random time before making a RACH attempt. The maximum allowable back off time depends on the number of dedicated preambles allocated and the service requirements (the delay tolerance of the data traffic). As an example, assume that all Group X devices in a paging occasion need to access the network within a number, n, of paging cycles. This means that the Group X devices for a specific paging occasion could evenly spread their RACH attempts over the next n paging cycles. One way to achieve this spreading is for the network to signal to the MTC device the value of n. Then, all UEs of Group X can randomly back-off over the period of nT paging cycles to make a RACH attempt. This limits the paging load.

However, if the paging message is lost, all MTC devices in Group X for paging occasion #0 will miss the opportunity to make RACH attempts over the next nT paging cycles. This duration can be very long, where there are a large number of MTC devices.

An alternative mechanism is to repeat the paging message for Group X in paging occasion #0 over the n paging cycles to maximise the number of UEs that receive the paging. In an enhancement to this mechanism, only some of the Group X devices are allowed to attempt RACH until the next paging message is received (in other words, over the next paging cycle). This means that UEs only randomly back-off over a paging cycle.

This can be achieved by including a repetition factor, R (R<n), in the paging message. This indicates that the paging message is the Rth time that the same paging message has been sent for UEs of that group in that specific paging occasion.

Using this information, devices of the paged Group in that paging occasion can decide if they should randomly back-off over the next paging cycle to make a RACH attempt. This may, for instance, operate as follows. For illustration purposes assume that the number of paging cycles, n=5. Then, when UE_ID Mod n=R, the UE knows that it is its turn to access the network.

The arrangement shown in table 320 of FIG. 2 is used for illustration purposes. In the paging message 330 in paging occasion #0, UEs number 0, 16, 32, 48, 64, 272 are identified, as well as Group X. Recall that UEs numbered 0 to 79 and 160 to 239 are all allocated to Group 'X' and UEs numbered 80 to 159 and 240 to 287 are all allocated to Group 'Y'. The Table below provides an example which UEs will access the network over the next paging cycle after receiving the Rth transmission of this paging message.

| R | UE IDs |
|---|---|
| 0 | 0, 160 |
| 1 | 16, 176 |
| 2 | 32, 192 |
| 3 | 48, 208 |
| 4 | 64, 224 |

Hence only UE numbers 0 and 160 will attempt access over the next paging cycle T after receiving the paging message with repetition factor 0. In the second paging cycle, UE numbers 16 and 176 attempt access and so on.

After n paging cycles, all Group X devices in paging occasion #0 should have attempted access. The network can then page Group X devices in paging occasion #1 and repeat this procedure until all the Group X devices in the system have been paged. It is assumed that in case of a collision, the UE would randomly back-off and retransmit at a later time. Considering the low collision probability caused by this dimensioning, this is an unlikely event.

This scheme allows the network to spread the RACH attempts of MTC devices identified by a certain Group ID evenly. In many cases, UEs identified by the same Group ID may be used for the same application. The operator can configure the number of RACH preambles over the desired period of time dependent upon the service requirements in terms of the RACH intensity generated by the devices and the delay tolerance of the service. The network can also set up a convenient time for MTC devices of a given application to send their data.

In summary, the following information is desirably transmitted in the paging message: a Group ID for which dedicated preambles apply (for example, a group IMSI of 61 bits can be used); a set of dedicated preambles to use (12 bits using the signalling of a start_offset and number of paged preambles); the number of paging cycles n, over which devices of the identified Group in the given paging occasion are expected to access the network (10 bits could be sufficient); and a repetition factor (R) to indicate that the paging message is the Rth transmission of a set of dedicated preambles for MTC devices of the identified Group in the given paging occasion (10 bits). A total of about 100 bits would likely be required to send this information. This quantity of data can be, accommodated within a paging message.

In order to illustrate how this scheme could be applied consider a smart metering application. If the number of meters per cell is about 107000 devices and assuming a meter reading is required every hour, such an application generates a RACH intensity of about 28 RACH attempts per second. The supported RACH intensity for a system providing L RACH opportunities per second for a 1% collision probability is 0.01*L. Hence, about 2800 RACH opportunities per second are required. If the number of RACH opportunities per preamble is 200 per second (for a typical PRACH configuration index), 14 dedicated preambles should be used.

The scheme can operate as follows. For a paging configuration of nB=T/2 and T=32 radio frames, 16 paging occasions are available. This means that the 107000 devices are spread over 32 paging occasions with 6890 devices per paging occasion. These devices are identified by a Group ID, which means that only these smart meters will use the dedicated preambles if paged Group ID matches their own. Assuming the smart meters are required to deliver their reading over one hour, this means that 225 seconds may be needed for devices of each paging occasion to make access (equating to 703 paging cycles). Thus, the number of paging cycles specified (n) should be 703 for this application.

Starting with the first paging message specifying the repetition factor, R, as 0, around 10 devices will access the network over the next paging cycle (320 ms) using one of 14 dedicated preambles. In the next paging message with R=1, another 10 devices will access and so on. Once all the devices in paging occasion #0 have been paged, the network can start with paging occasion #1 and so on. Thus over a one hour period, all smart meters would have accessed the network in a controlled manner.

The increase in paging load is one paging message every 320 ms which is 3 paging message per second. Moreover, the network can additionally send a set of dedicated preambles for more than one application by using a different Group ID for each preamble group.

This mechanism gives control regarding the expected paging load over a short period of time (for instance, a paging cycle) to the operator. It also provides flexibility of interleaving paging of dedicated preambles for different MTC device applications with delay-tolerant data, without risking a RACH overload.

The UE handling of paging messages may be adjusted to cope with paging messages containing dedicated Preambles and a Group ID. The normal behaviour when an the Access Stratum (AS) receives a paging message is to pass it to upper layers, to then initiate the service request. If MTC devices are to be paged in order to retrieve their data, it is desirable that the UE knows that the purpose of the paging is not for a Mobile-Termination (MT) call but rather to pull data from the UE. With this knowledge, the UE upper layer protocols can avoid initiating a service request, if there is no pending data to send. This will improve the RACH success as devices which have already sent their data will not attempt to access the network again as a result of the paging.

There are a number of benefits of this approach. As with the previously described mechanism, the network has control over when devices access the network. Also, RACH failure is reduced, as only a small group of devices try to access the network using the limited set of preambles at any one time. There is additionally a reduced paging load, since one paging message can be used to trigger a group of MTC devices to access the network. More Flexibility is provided in how the network distributes RACH resources between MTC devices having different applications and also between MTC devices having the same Machine-to-Machine (M2M) application. Finally, the mechanism can allow a more even distribution of RACH intensity generated by MTC devices over a certain time period. This helps MTC devices to generate minimal additional RACH load in the network.

Example: Paging Message

An example of how the paging message is modified is given below. The Paging message is used for the notification of a Group of UEs.

```
-- ASN1START
Paging ::=                      SEQUENCE {
    pagingRecordList
    PagingRecordList            OPTIONAL, -- Need ON
    systemInfoModification      ENUMERATED {true}
                                OPTIONAL, -- Need-ON
    etws-Indication             ENUMERATED {true}
                                OPTIONAL, -- Need ON
    MTC-Indication              ENUMERATED {true}
                                OPTIONAL, -- Need ON
    nonCriticalExtension        Paging-v9x0-IEs
                                OPTIONAL -- Need OP
}
Paging-v9x0-IEs ::=             SEQUENCE {
    cmas-Indication-r9          ENUMERATED {true}
                                OPTIONAL, -- Need ON
    nonCriticalExtension        SEQUENCE { }
                                OPTIONAL -- Need OP
}
PagingRecordList ::=            SEQUENCE (SIZE
(1..maxPageRec)) OF PagingRecord
PagingRecord ::=                SEQUENCE {
    ue-Identity                 PagingUE-Identity,
    cn-Domain                   ENUMERATED   {ps, cs},
    MTCDevicePreambles
                    PreambleSetParameters OPTIONAL -Cond UE-
ID
    ...
}
PagingUE-Identity ::=           CHOICE {
    s-TMSI                                  S-TMSI,
```

```
        imsi                       IMSI,
        Group-IMSI                 IMSI,
        ...
}
PreambleSetParameters ::= Sequence
{
        Start-offset    INTEGER (0..64),
        NumberOfMTCPreambles       INTEGER (0..64),
        RandomisationTime          INTEGER (0..1024)
        RepetitionFactor           INTEGER (0..1024)
        ...
}
IMSI ::=                           SEQUENCE (SIZE
(6..21)) OF IMSI-Digit
IMSI-Digit::=                      INTEGER (0..9)
-- ASN1STOP
```

The skilled person will appreciate that the transmitter and receiver in the base station, MTC devices or both may be embodied in an integrated transceiver.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of controlling access by a User Equipment (UE) to a cellular network, comprising:
  receiving an instruction at the UE from a base station of the cellular network to make a transmission from the UE over a Random Access Channel (RACH) of the cellular network, wherein the UE has an associated Group Identifier, and wherein the instruction further specifies a Group Identifier;
  comparing, at the UE, the Group Identifier specified by the instruction with the Group Identifier associated with the UE; and
  based on a result of the comparison, making the transmission from the UE over the RACH in response to the received instruction, if the UE has data to send over the cellular network, in order to send this data.

2. The method of claim 1, further comprising:
  receiving a plurality of temporary identifiers at the UE, each temporary identifier being suitable for identifying transmissions from a UE over the RACH; and
  selecting a temporary identifier at the UE from a subset of the plurality of temporary identifiers; and
  wherein the step of making a transmission from the UE over the RACH uses the selected temporary identifier.

3. The method of claim 1, wherein the instruction received at the UE provides an indication of a temporary identifier suitable for identifying transmissions from a UE over the RACH and wherein the step of making a transmission from the UE over the RACH uses the temporary identifier indicated by the instruction.

4. The method of claim 1, wherein the instruction comprises a repetition indication, the method further comprising:
  transmitting a repeat of the instruction to the UE from the base station; and
  wherein the repeat of the instruction is identical to the instruction except in respect of the repetition indication.

5. The method of claim 1, further comprising:
  determining the Group Identifier associated with the UE, at the UE, based on an identifier specific to the UE or a Subscriber Identity Module associated with the UE.

6. The method of claim 1, further comprising:
  transmitting the Group Identifier associated with the UE from a base station of the cellular network to the UE.

7. The method of claim 1, wherein the UE is a Machine Type Communication device.

8. The method of claim 1, wherein the UE uses a Universal Mobile Telecommunications System (UMTS) or Long Term Evolution (LTE) Radio Access Technology.

9. The method of claim 1, further comprising:
  transmitting the instruction to the UE from the base station of the cellular network.

10. A method of controlling access by a User Equipment (UE) to a cellular network, the UE having an associated Group Identifier distinct from an Access Class associated with the UE, the method comprising:
  receiving an instruction at the UE from a the base station of the cellular network to make a transmission from the UE over a Random Access Channel (RACH) of the cellular network, the instruction further specifying a Group Identifier;
  comparing, at the UE, the Group Identifier specified by the instruction with the Group Identifier associated with the UE; and
  avoiding making a transmission from the UE over the RACH for a period of time based on the result of the step of comparing.

11. The method of claim 10, wherein the period of time for avoiding making a transmission is predetermined or specified in the instruction.

12. The method of claim 10, further comprising:
  determining the Group Identifier associated with the UE, at the UE, based on an identifier specific to the UE or a Subscriber Identity Module associated with the UE.

13. The method of claim 10, further comprising:
  transmitting the Group Identifier associated with the UE from a base station of the cellular network to the UE.

14. The method of claim 10, wherein the UE is a Machine Type Communication device.

15. The method of claim 10, wherein the UE uses a Universal Mobile Telecommunications System (UMTS) or Long Term Evolution (LTE) Radio Access Technology.

16. The method of claim 10, further comprising:
transmitting the instruction to the UE from the base station of the cellular network.

17. A User Equipment (UE) for a cellular network, the UE having an associated Group Identifier that is distinct from an Access Class associated with the UE, the UE comprising:
a processor configured to receive an instruction from a base station of the cellular network, the instruction specifying a Group Identifier, and further configured to compare the specified Group Identifier and the Group Identifier associated with the UE, and to control the UE to avoid transmissions over a Random Access Channel (RACH) of the cellular network for a period of time based on the comparison.

18. A User Equipment (UE) for a cellular network, comprising:
a receiver arranged to receive an instruction from a base station of the cellular network to make a transmission over a Random Access Channel (RACH) of the cellular network, wherein the UE has an associated Group Identifier, and wherein the instruction further specifies a Group Identifier;
a transmitter for transmitting the transmission over the RACH; and
a processor, configured to:
compare, at the UE, the Group Identifier specified by the instruction with the Group Identifier associated with the UE; and
based on a result of the comparison, control the transmitter to transmit the transmission over the RACH in response to the received instruction, if the UE device has data to send over the cellular network, in order to send this data.

19. A non-transitory computer readable medium storing software for controlling access by a User Equipment (UE) to a cellular network, the software comprising:
executable code that receives an instruction at the UE from a base station of the cellular network to make a transmission from the UE over a Random Access Channel (RACH) of the cellular network; and
executable code that compares, at the UE, the Group Identifier specified by the instruction with the Group Identifier associated with the UE; and
executable code that, based on a result of the comparison, makes the transmission from the UE over the RACH in response to the received instruction, if the UE has data to send over the cellular network, in order to send this data.

20. A non-transitory computer readable medium storing software for controlling access by a User Equipment (UE) to a cellular network, the UE having an associated Group Identifier distinct from an Access Class associated with the UE, the software comprising:
executable code that receives an instruction at the UE from a base station of the cellular network to make a transmission from the UE over a Random Access Channel (RACH) of the cellular network, the instruction further specifying a Group Identifier;
executable code that compares, at the UE, the Group Identifier specified by the instruction with the Group Identifier associated with the UE; and
executable code that avoids making a transmission from the UE over the RACH for a period of time based on a result from the executable code that receives the instruction.

* * * * *